US 8,244,948 B2

(12) United States Patent
Johnson et al.

(10) Patent No.: US 8,244,948 B2
(45) Date of Patent: Aug. 14, 2012

(54) METHOD AND SYSTEM FOR COMBINING MULTIPLE SAS EXPANDERS INTO A SAS SWITCH

(75) Inventors: Stephen B. Johnson, Colorado Springs, CO (US); Christopher McCarty, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 185 days.

(21) Appl. No.: 12/791,244

(22) Filed: Jun. 1, 2010

(65) Prior Publication Data

US 2010/0241779 A1    Sep. 23, 2010

Related U.S. Application Data

(63) Continuation-in-part of application No. 12/384,289, filed on Apr. 2, 2009, now Pat. No. 7,849,248, and a continuation-in-part of application No. 12/384,291, filed on Apr. 2, 2009, now Pat. No. 8,077,605, and a continuation-in-part of application No. 12/384,287, filed on Apr. 2, 2009, now Pat. No. 7,913,023.

(60) Provisional application No. 61/191,037, filed on Sep. 5, 2008.

(51) Int. Cl.
   *G06F 13/00*    (2006.01)
(52) U.S. Cl. ......... 710/300; 710/309; 710/311; 710/312
(58) Field of Classification Search .......... 710/300–317, 710/8–19, 104–110, 62–64, 2–3, 72; 711/2, 711/118, 135, 141
See application file for complete search history.

(56) References Cited

U.S. PATENT DOCUMENTS

| 6,598,106 | B1 | 7/2003 | Grieshaber et al. |
| 6,622,163 | B1 | 9/2003 | Tawill et al. |
| 6,697,359 | B1 | 2/2004 | George |
| 6,765,919 | B1 | 7/2004 | Banks et al. |
| 6,804,245 | B2 | 10/2004 | Mitchem et al. |
| 7,035,952 | B2 | 4/2006 | Elliott et al. |
| 7,171,500 | B2 | 1/2007 | Day et al. |
| 7,275,935 | B2 * | 10/2007 | Chen et al. ...................... 439/61 |
| 7,363,382 | B1 | 4/2008 | Bakke et al. |
| 7,376,789 | B2 * | 5/2008 | Halleck et al. ................ 711/118 |

(Continued)

FOREIGN PATENT DOCUMENTS

EP    1796003 A2    6/2007
(Continued)

OTHER PUBLICATIONS

Czekalski, Marty, "Serial Attached SCSI Architecture", May 20, 2003, SCSI Trade Association, retrieved from the Internet at http://scsita.org/aboutscsi/sas/SAS_Architecture_Overview.pdf, pp. 1-13.

(Continued)

*Primary Examiner* — Raymond Phan
(74) *Attorney, Agent, or Firm* — Suiter Swantz pc llo

(57) ABSTRACT

A first SAS expander including at least phys is operably coupled to a first and a second SAS wide port. A second SAS expander including at least two phys is operably coupled to the first and the second SAS wide port. The first and the second SAS wide port each include at least two lanes, one of each at least two lanes designateable as a connection request lane. The connection request lane of each SAS wide port is operably coupled to a different SAS expander.

13 Claims, 13 Drawing Sheets

U.S. PATENT DOCUMENTS

| | | | |
|---|---|---|---|
| 7,415,549 B2* | 8/2008 | Vemula et al. | 710/22 |
| 7,437,462 B2 | 10/2008 | Marks et al. | |
| 7,451,255 B2* | 11/2008 | Gustafson et al. | 710/62 |
| 7,502,884 B1 | 3/2009 | Shah et al. | |
| 7,529,877 B2 | 5/2009 | Bashford et al. | |
| 7,536,584 B2 | 5/2009 | Davies et al. | |
| 7,644,168 B2 | 1/2010 | Grieff et al. | |
| 7,668,925 B1 | 2/2010 | Liao et al. | |
| 7,707,338 B1 | 4/2010 | Walch et al. | |
| 7,721,021 B2 | 5/2010 | Johnson | |
| 7,730,252 B2 | 6/2010 | Odenwald et al. | |
| 7,738,366 B2* | 6/2010 | Uddenberg et al. | 370/229 |
| 7,797,463 B2* | 9/2010 | Halleck et al. | 710/30 |
| 2005/0071532 A1* | 3/2005 | Bakke et al. | 710/300 |
| 2005/0080881 A1 | 4/2005 | Voorhees et al. | |
| 2005/0108452 A1 | 5/2005 | Loffink | |
| 2005/0138221 A1 | 6/2005 | Marushak | |
| 2005/0193178 A1 | 9/2005 | Voorhees et al. | |
| 2006/0031612 A1 | 2/2006 | Bashford et al. | |
| 2006/0101171 A1 | 5/2006 | Grieff et al. | |
| 2006/0194386 A1 | 8/2006 | Yao et al. | |
| 2006/0230125 A1 | 10/2006 | Johnson | |
| 2007/0005862 A1 | 1/2007 | Seto | |
| 2007/0028062 A1 | 2/2007 | Radhakrishnan et al. | |
| 2007/0070885 A1 | 3/2007 | Uddenberg et al. | |
| 2007/0070994 A1 | 3/2007 | Burroughs et al. | |
| 2007/0073967 A1 | 3/2007 | Peeke | |
| 2007/0088917 A1 | 4/2007 | Ranaweera et al. | |
| 2007/0088978 A1 | 4/2007 | Lucas et al. | |
| 2007/0165660 A1 | 7/2007 | Fang et al. | |
| 2007/0198761 A1 | 8/2007 | Duerk et al. | |
| 2007/0220204 A1* | 9/2007 | Nakajima et al. | 711/114 |
| 2007/0276981 A1* | 11/2007 | Atherton et al. | 710/307 |
| 2007/0294572 A1 | 12/2007 | Kalwitz et al. | |
| 2008/0104264 A1* | 5/2008 | Duerk et al. | 709/230 |
| 2008/0120687 A1 | 5/2008 | Johnson | |
| 2008/0126631 A1 | 5/2008 | Bailey et al. | |
| 2008/0162773 A1* | 7/2008 | Clegg et al. | 710/316 |
| 2008/0162987 A1 | 7/2008 | El-Batal | |
| 2008/0183937 A1 | 7/2008 | Cagno et al. | |
| 2008/0244620 A1 | 10/2008 | Cagno et al. | |
| 2008/0267192 A1 | 10/2008 | Blinick et al. | |
| 2009/0006697 A1* | 1/2009 | Doherty et al. | 710/300 |
| 2009/0007154 A1 | 1/2009 | Jones | |
| 2009/0094620 A1 | 4/2009 | Kalwitz et al. | |
| 2009/0222733 A1 | 9/2009 | Basham et al. | |

FOREIGN PATENT DOCUMENTS

| | | | |
|---|---|---|---|
| JP | 2006072636 A | 3/2006 | |
| JP | 2009181317 A | 8/2009 | |
| JP | 2009187399 A | 8/2009 | |
| JP | 2010061663 A | 3/2010 | |
| JP | 2010061666 A | 3/2010 | |
| WO | WO 2007001728 A1 | 1/2007 | |
| WO | WO 2007146515 A2 | 12/2007 | |
| WO | WO 2008045457 A2 | 4/2008 | |

OTHER PUBLICATIONS

Lobue et al., "Surveying Today's Most Popular Storage Interfaces." Dec. 2002, Computer, vol. 35, No. 12, pp. 48-55.

Na et al., "Link analysis and design of high speed storage buses in backplane and cabling environments," Jun. 1-4, 2010, 2010 Proceedings of the Electronic Components and Technology Conference (ECTC), pp. 1929-1934.

Liao et al., "Managing Access Control Through SAS Zoning," Sep. 2005, PMC-Sierra, Inc., Document No. PMC-2051469, Issue 1, pp. 1-19.

Elliott, Robert C., "Serial Attached SCSI (SAS)", Working Draft American National Standard; Revision 5, Jul. 9, 2003.

Microsoft: "How Network Load Balancing Works"; TechNet, Jan. 21, 2005; URL:http://technet.microsoft.com/en-us/lib (retrieved from internet Nov. 20, 2009).

* cited by examiner

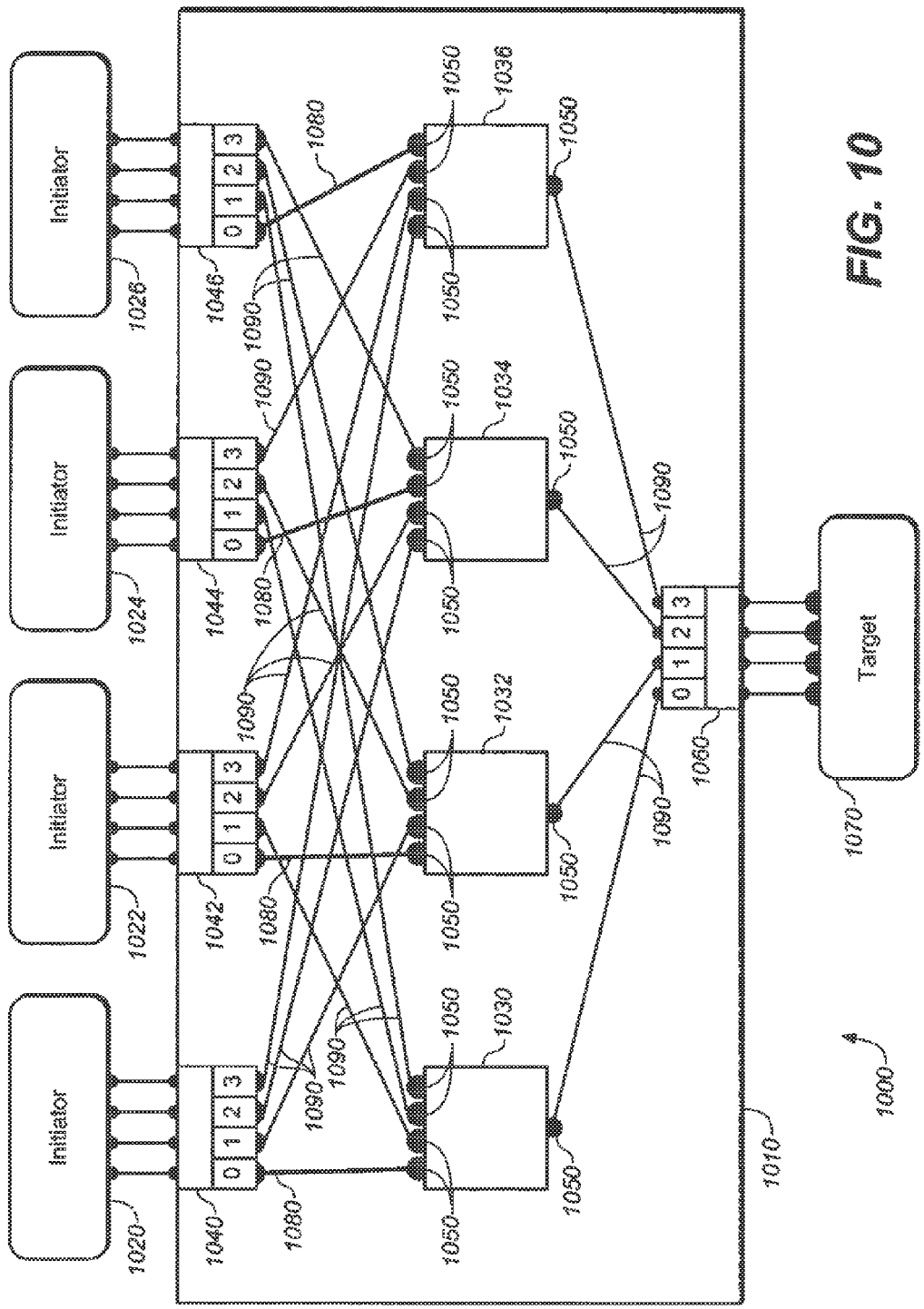

METHOD AND SYSTEM FOR COMBINING MULTIPLE SAS EXPANDERS INTO A SAS SWITCH

CROSS-REFERENCE TO RELATED APPLICATIONS

The present application claims priority from the following copending U.S. patent applications and is a continuation-in-part of copending U.S. patent application Ser. No. 12/384,289 titled, "COMBINING MULTIPLE SAS EXPANDERS TO PROVIDE SINGLE SAS EXPANDER FUNCTIONALITY", filed Apr. 2, 2009; copending U.S. patent application Ser. No. 12/384,291 titled, "METHOD FOR PROVIDING PATH FAILOVER FOR MULTIPLE SAS EXPANDERS OPERATING AS A SINGLE SAS EXPANDER", filed Apr. 2, 2009; and copending U.S. patent application Ser. No. 12/384,287 titled, "SPECIFYING LANES FOR SAS WIDE PORT CONNECTIONS", filed Apr. 2, 2009; all of which, along with the present application, claim the benefit under 35 U.S.C. §119(e) of U.S. Provisional Application Ser. No. 61/191,037, filed Sep. 5, 2008. All of these applications are incorporated herein by reference.

TECHNICAL FIELD

The present disclosure generally relates to the field of Serial Attached SCSI, and more particularly to a system, method, and product for combining multiple SAS expanders into a SAS switch.

BACKGROUND

Serial Attached SCSI (SAS) is a term referring to various technologies designed to implement data transfer between computer devices. The SAS protocol is a serial successor to the parallel Small Computer System Interface. In the SAS protocol, all SAS devices are either an initiator device, a target device, or an expander device. Initiator devices are devices that begin an SAS data transfer, while target devices are the devices to which initiator devices transfer data. Together, initiator devices and target devices are known as end devices.

SAS expanders are devices that facilitate data transfer between multiple initiator devices and multiple target devices. The SAS protocol utilizes a point-to-point bus topology. Therefore, if an initiator device is required to connect to multiple target devices, a direct connection must be made between the initiator device and each individual target device in order to facilitate each individual data transfer between the initiator device and each individual target device. SAS expanders manage the connections and data transfer between multiple initiator devices and multiple target devices. SAS expanders may contain SAS devices.

SUMMARY

A SAS switch may include, but is not limited to: at least two SAS expanders, a first SAS expander including at least two phys; a second SAS expander including at least two phys; a first SAS wide port including at least two lanes, one of the at least two lanes of the first SAS wide port designateable as a connection request lane; and a second SAS wide port including at least two lanes, one of the at least two lanes of the second SAS wide port designateable as a connection request lane, wherein the connection request lane of each SAS wide port is operably coupled to a different SAS expander of the at least two SAS expanders.

A method for combining multiple SAS expanders into a SAS switch, may include, but is not limited to: grouping a first SAS expander including at least two phys with at least a second SAS expander including at least two phys into at least a first common wide port, wherein the first common wide port includes at least two lanes; grouping the first SAS expander with at least the second SAS expander into at least a second common SAS wide port, wherein the second common wide port includes at least two lanes, wherein one of the at least two lanes of the first SAS wide port is designateable as a connection request lane, wherein one of the at least two lanes of the second SAS wide port is designateable as a connection request lane; and operably coupling the connection request lane of each SAS wide port to a different expander.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 10 is a block diagram illustrating multiple SAS expanders operating as a SAS switch.

DETAILED DESCRIPTION

Figure 1:
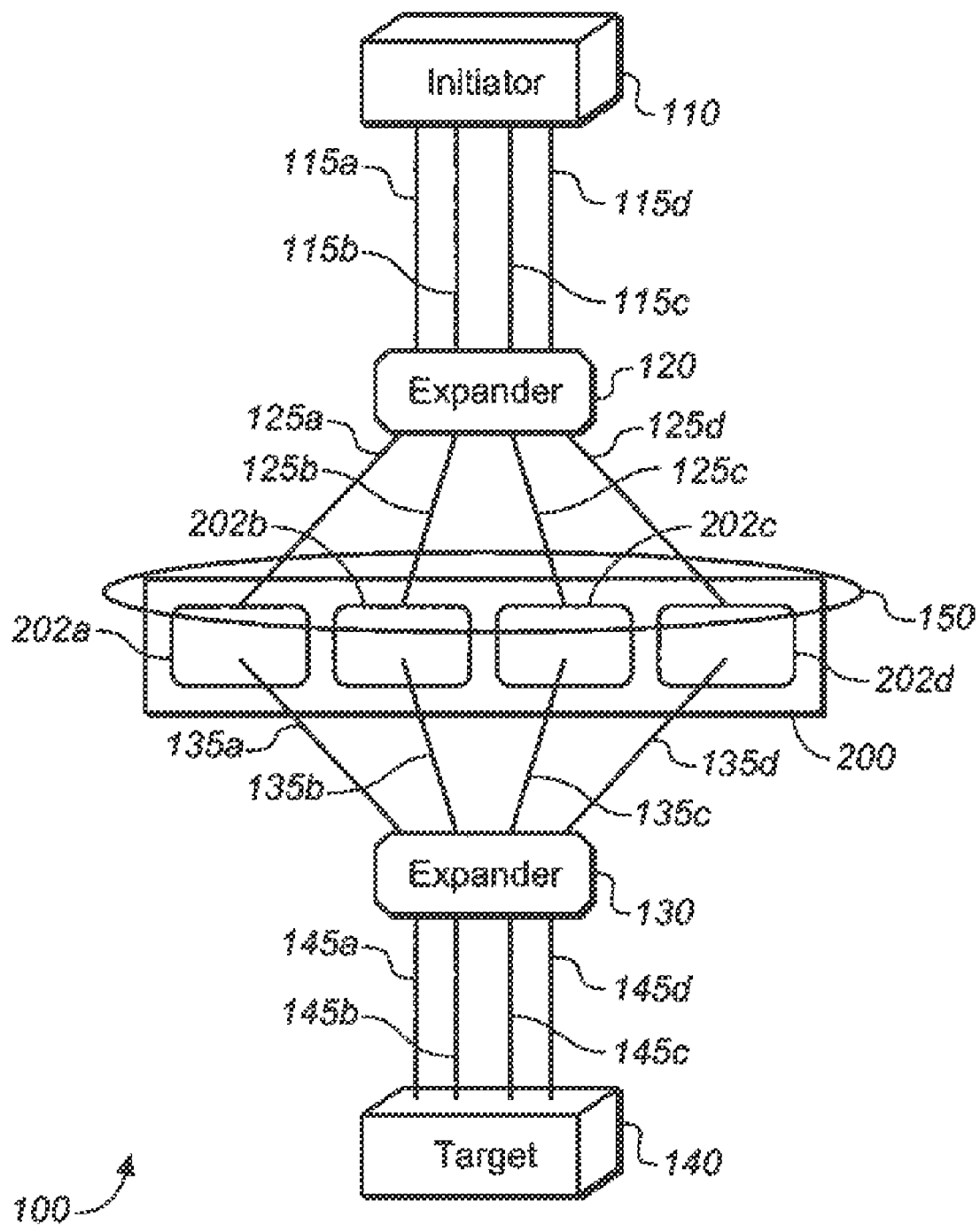
FIG. 1 is a block diagram illustrating a SAS topology illustrating a single, cohesive SAS expander.
Figure 2A:
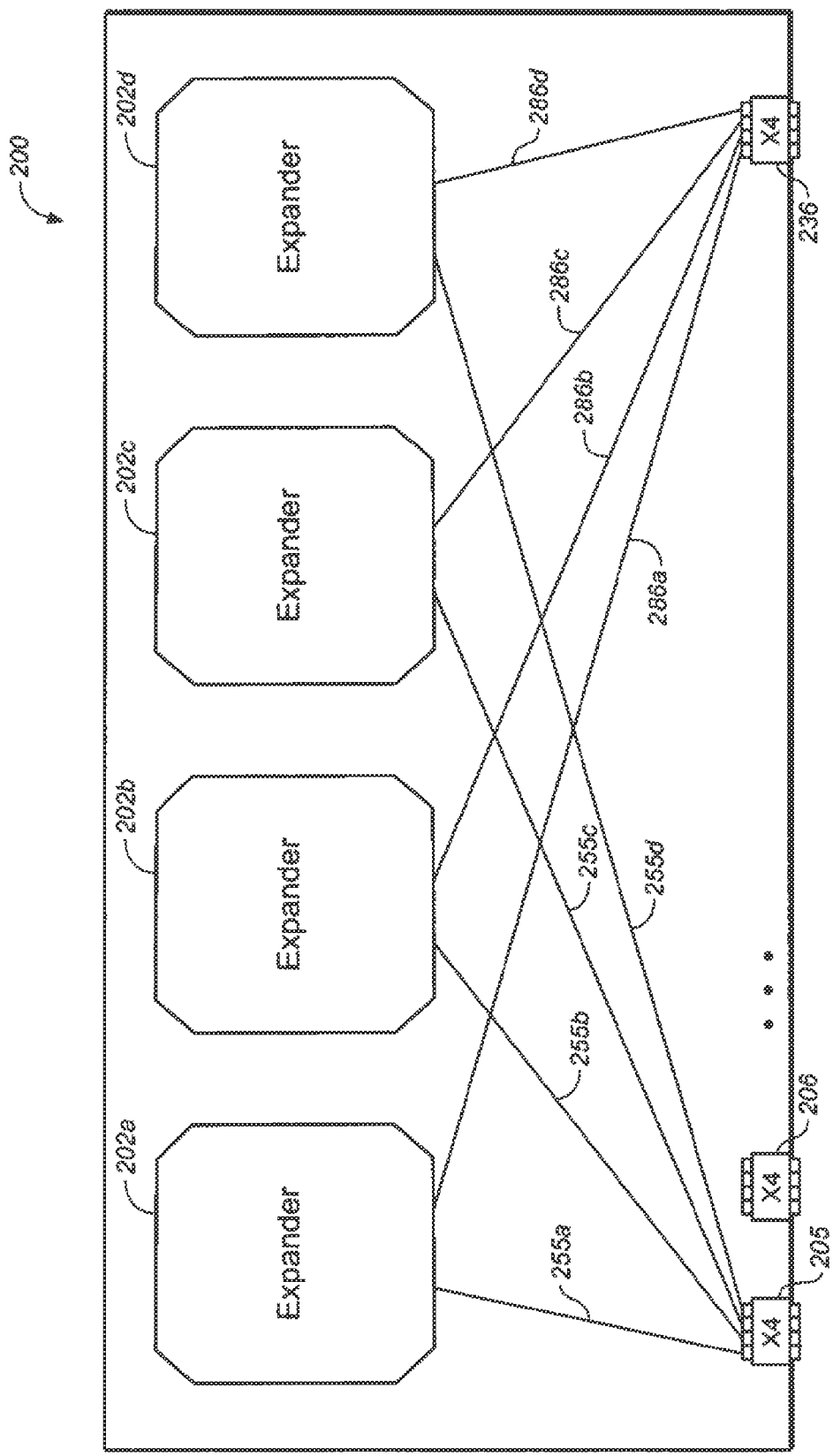
FIGS. 2A through 2E are block diagrams illustrating various configurations of a single, cohesive SAS expander.
Figure 2B:
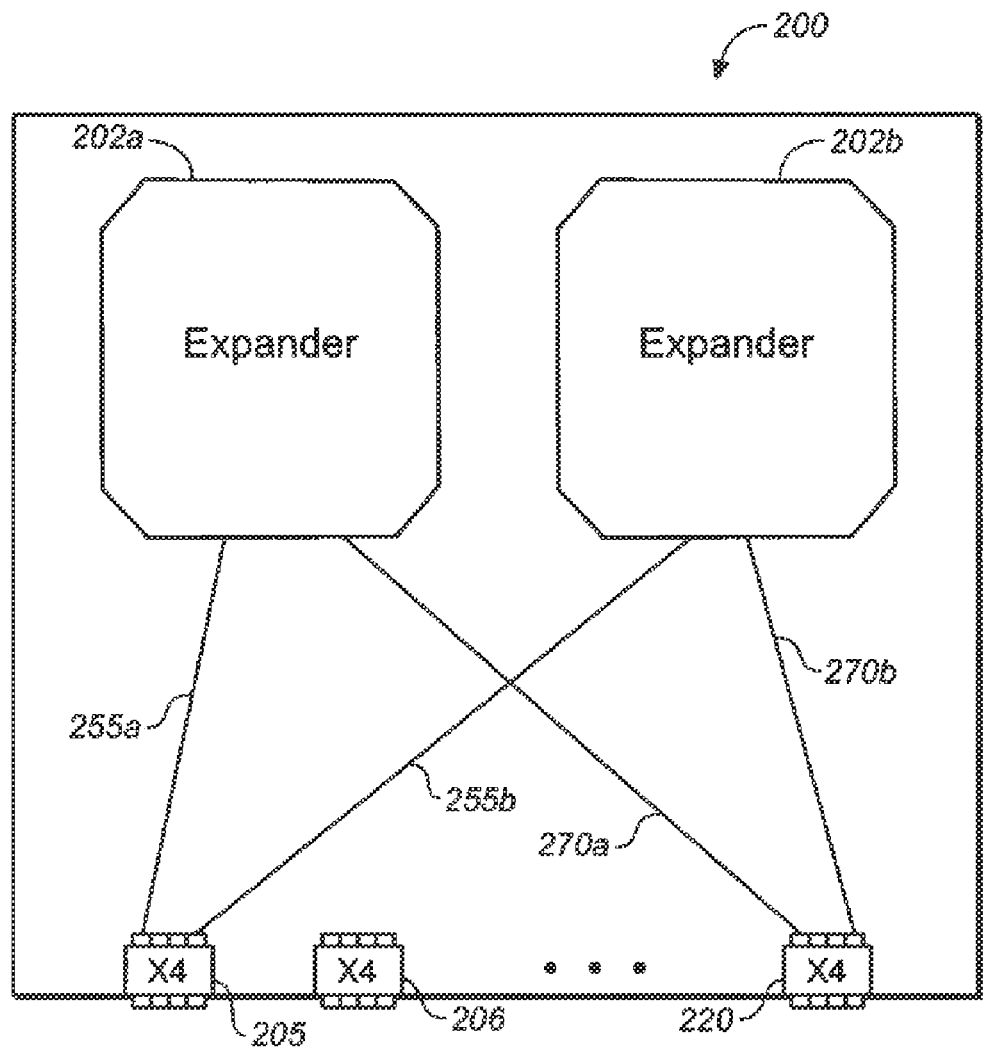
Figure 2C:
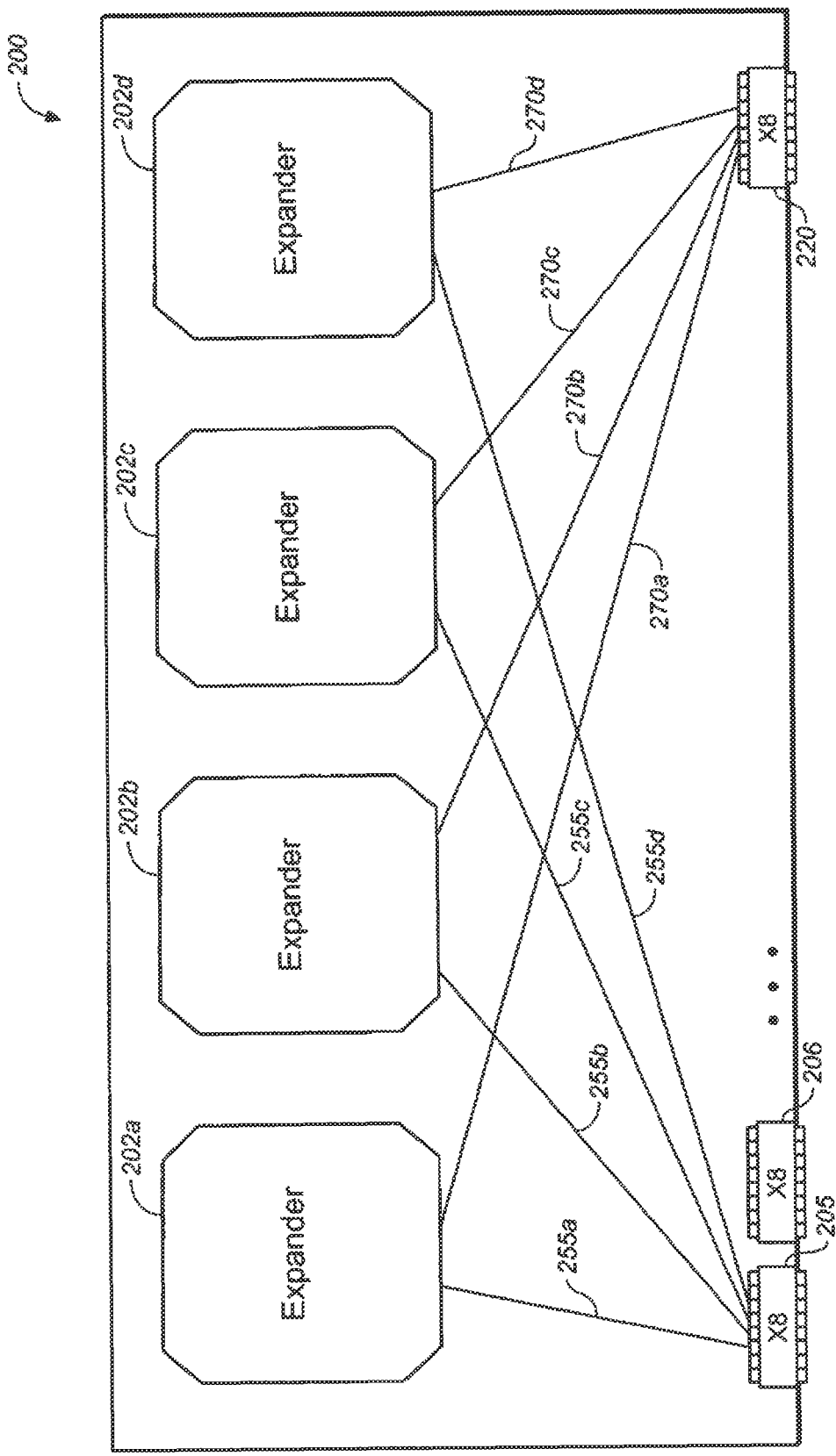
Figure 2D:
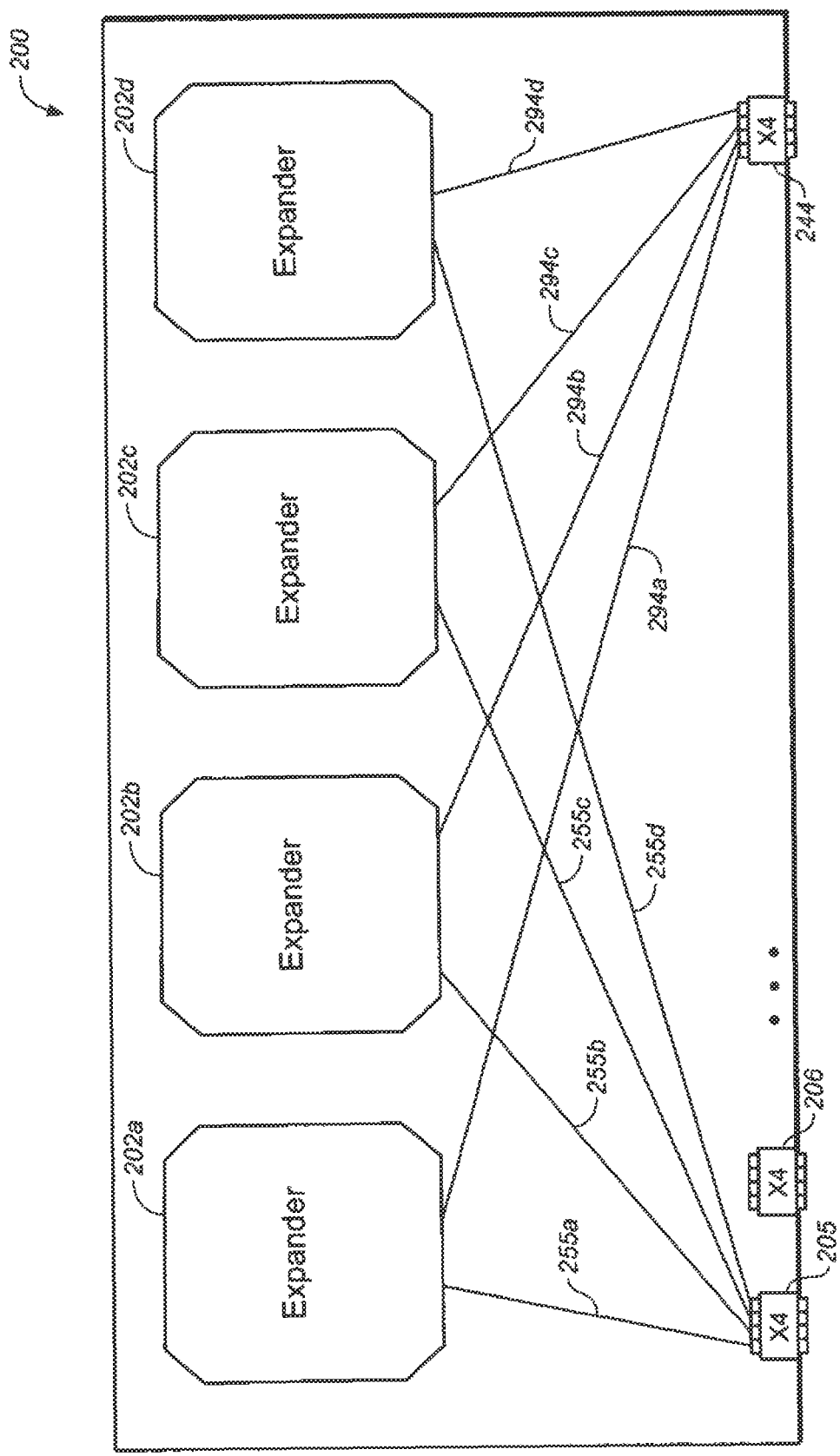
Figure 2E:
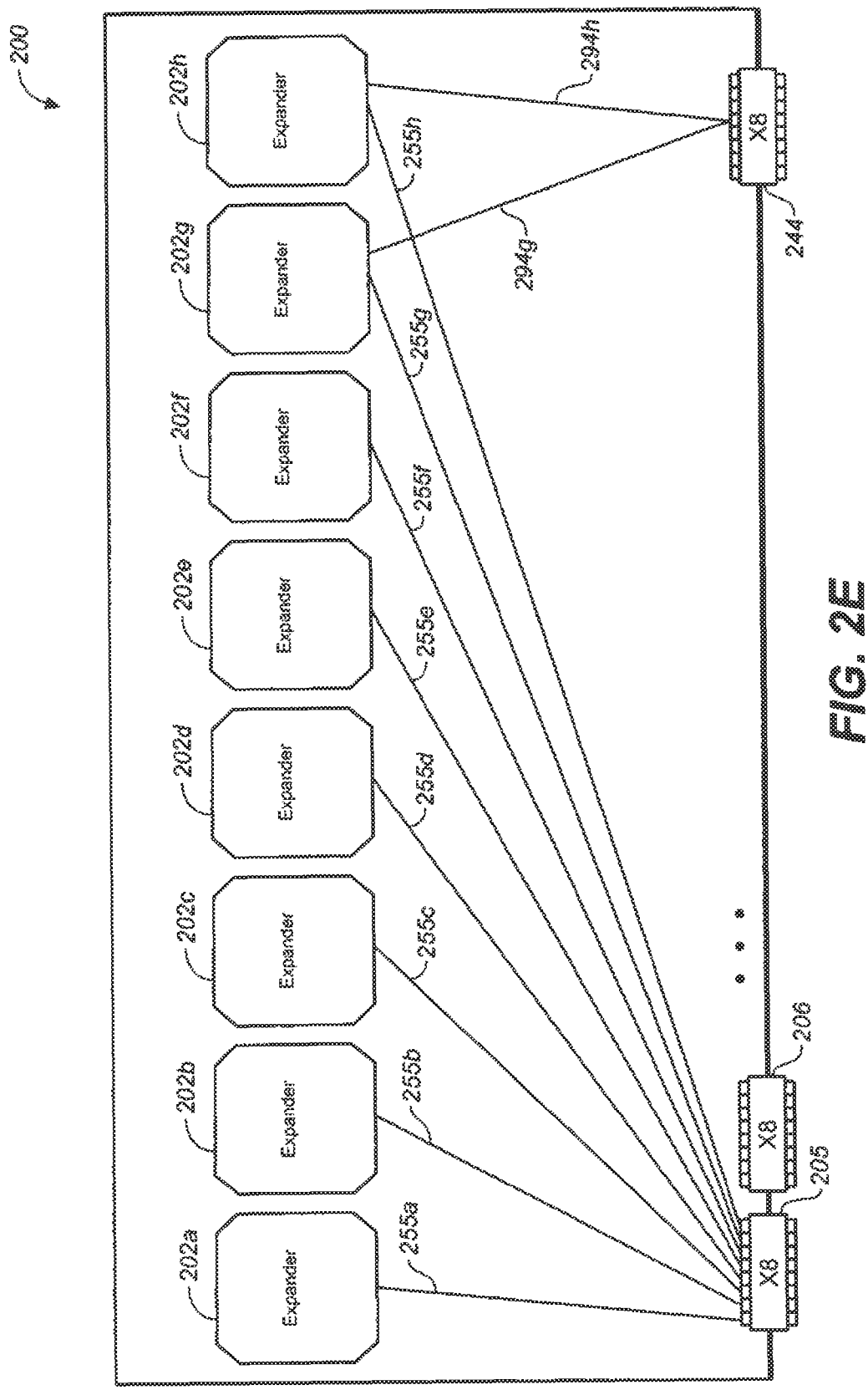

Reference will now be made in detail to the subject matter disclosed, which is illustrated in the accompanying drawings.

A SAS topology featuring a single, cohesive SAS expander in accordance with an exemplary embodiment of the present disclosure is shown. The topology 100 may include initiator 110 connected to expander 120 via narrow ports 115*a* . . . *d*. Expander 120 may be connected to single, cohesive SAS expander 200 via narrow ports 125a . . . d. Single, cohesive SAS expander 200 may contain a plurality of physically separate SAS expanders 202a . . . d. SAS expanders 202a . . . d may be configured to share an identical SAS address to combine narrow ports 125a . . . d to behave as single common wide port 150. As shown in SAS topology 100, narrow ports 125a . . . d may combine to make x4-wide port 150. SAS expanders 202a . . . d may be connected to expander 130 via narrow ports 135a . . . d. Expander 130 may be connected to target 140 via narrow ports 145a . . . d. SAS specifications require that all connections be point-to-point. However, SAS topology 100 is SAS specification compliant because wide port 150 is a true SAS wide port.

Referring to FIGS. 2A-2E, cohesive SAS expander 200 may contain a plurality of physically separated SAS expanders 202a . . . h. SAS expanders 202a . . . h may be connected to output ports 205-244 via links 255a . . . h-294a . . . h. Widely varying configurations of single, cohesive SAS expander 200 are contemplated by the present disclosure, depending on the number of SAS expanders 202a . . . h, the number of ports of SAS expanders 202a . . . h, the number of output ports 205-244, the width of output ports 205-244, and the number of SAS expander ports used in links 255a . . . h-294a . . . h.

Output ports 205-244 may be wide ports. Output ports 205-244 may be configured to share an identical SAS address. Under SAS specifications, this defines output ports 205-244 to be a single wide port of the same expander. Each of output ports 205-244 may be connected to every SAS expander 202a . . . h (Not shown). The width of output ports 205-244 may depend on how many SAS expander ports are used in links 255a . . . h-294a . . . h to connect to each of output ports 205-244. Each of SAS expander 202a . . . h may have multiple SAS expander ports connected to each of output ports 205-244. For example, if single, cohesive SAS expander 200 contains two SAS expanders 202a-h connected to each of output ports 205-244 via links 255a . . . h-294a . . . h using one SAS expander port, then output ports 205-244 will be a x2 wide port. Furthermore, if single, cohesive SAS expander 200 contains two SAS expanders 202a-h connected to each of output ports 205-244 via links 255a . . . h-294a . . . h using two SAS expander ports, then output ports 205-244 will be a x4 wide port. These configurations may allow for simultaneous access of any port to any other port of single, cohesive SAS expander 200 at full port bandwidth.

Figure 3:
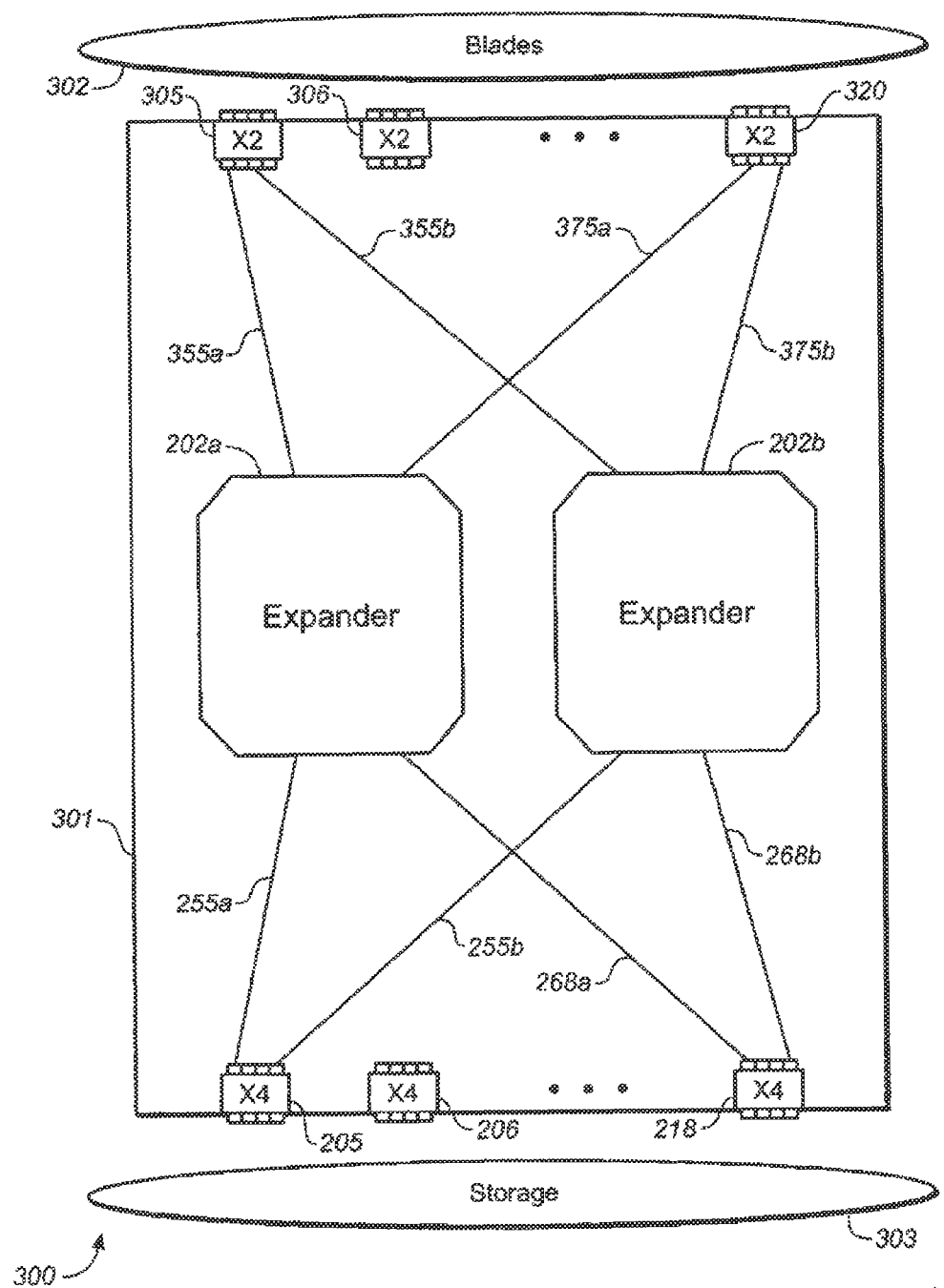
FIG. 3 is block diagram illustrating a blade center switch configuration of a single, cohesive SAS expander.

A blade center switch configuration 301 of single, cohesive SAS expander 300 is provided. Referring to FIG. 3, multiple CPU blades 302 may be connected to input ports 305-320. Input ports 305-320 may be wide ports. Input ports 305-320 may be configured to share an identical SAS address. Under SAS specifications, this defines input ports 305-320 to be a single wide port of the same expander. Each of input ports 305-320 may be connected to each of SAS expanders 202a . . . b via links 355a . . . b-375a . . . b (Not shown). As shown in blade center switch configuration 301, input ports 305-320 are x2 wide ports connected to two SAS expanders 202a . . . b via links 355a . . . b-375a . . . b using one SAS expander port, but other configurations are fully contemplated by these disclosures. Each of SAS expanders 202a . . . b may be connected to each of output ports 205-218 via links 255a . . . b-268a . . . b (Not shown). As shown in blade center switch configuration 301, output ports 205-218 are x4 wide ports connected to two SAS expanders 202a . . . b via links 255a . . . b-268a . . . b using two SAS expander ports, but other configurations are fully contemplated by the current disclosure. Output ports 205-218 may be connected to multiple data storage devices 303.

Figure 4:
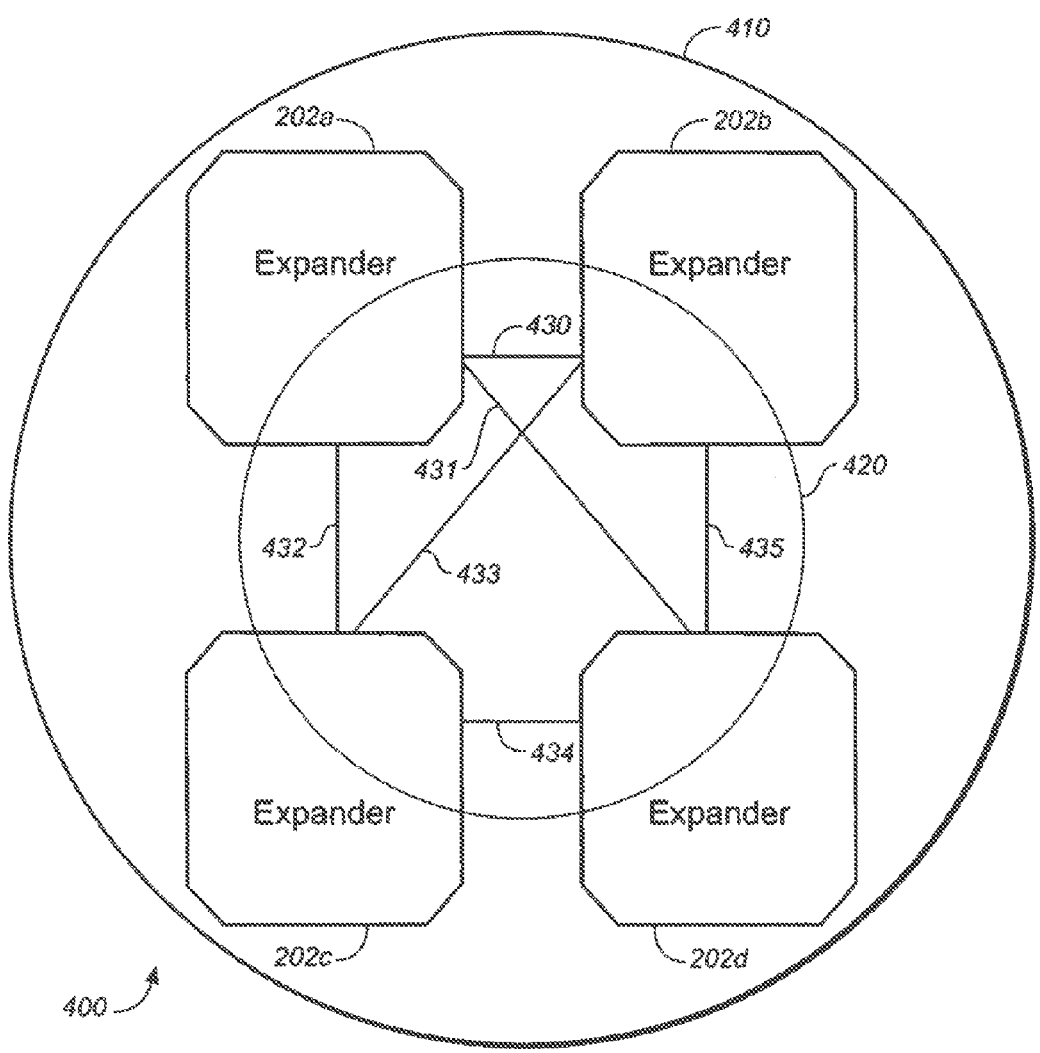
FIG. 4 is a block diagram illustrating the inter-expander links of a single, cohesive SAS expander.

SAS expanders 202a . . . h may be configured to share an identical SAS address. Under SAS specifications, this defines SAS expanders 202a . . . h to be a single expander. Firmware may run on each of SAS expanders 202a . . . h so SAS expanders 202a . . . h behave and respond as a single expander. As shown in FIG. 4, each of SAS expanders 202a . . . h may be connected to each of 202a . . . h via inter-expander links (IEL) 430-435. IEL 430-435 may allow SAS expanders 202a . . . h to communicate and coordinate to behave and respond as a single expander. IEL 430-435 may communicate via the SAS Management Protocol (SMP) or other communication methods, such as Inter-Integrated Circuit Bus Protocol (I2C), Enhanced Parallel Port (EPP), Ethernet, shared memory, and the like. IEL 430-435 may permit the IEL domain 420 to be zoned from primary switched domain 410. Broadcasts may be disabled in IEL 430-435 to eliminate any SAS specification non-compliant loop issues. IEL 430-435 may use multiple SAS expander ports. The phys used in IEL 430-435 may be completely hidden from the primary switched domain. The numbering of the phys used in the primary switched domain of SAS expanders 202a . . . h may be remapped to a single, logical numbering. IEL 430-435 may allow any combination of SAS expanders 202a . . . h to fail while connectivity is maintained between any functional SAS expanders 202a . . . h. Further, all input ports 305-320 and output ports 205-244 may maintain connectivity at a reduced bandwidth in the event of less than every SAS expander 202a . . . h failing. SMP target processing may be handled by a single master SAS expander of single, cohesive SAS expander 200. Connection requests to single, cohesive SAS expander 200 may be routed to the single master SAS expander via IEL 430-435. SAS expanders 202a . . . h may share SMP target processing.

Figure 6:
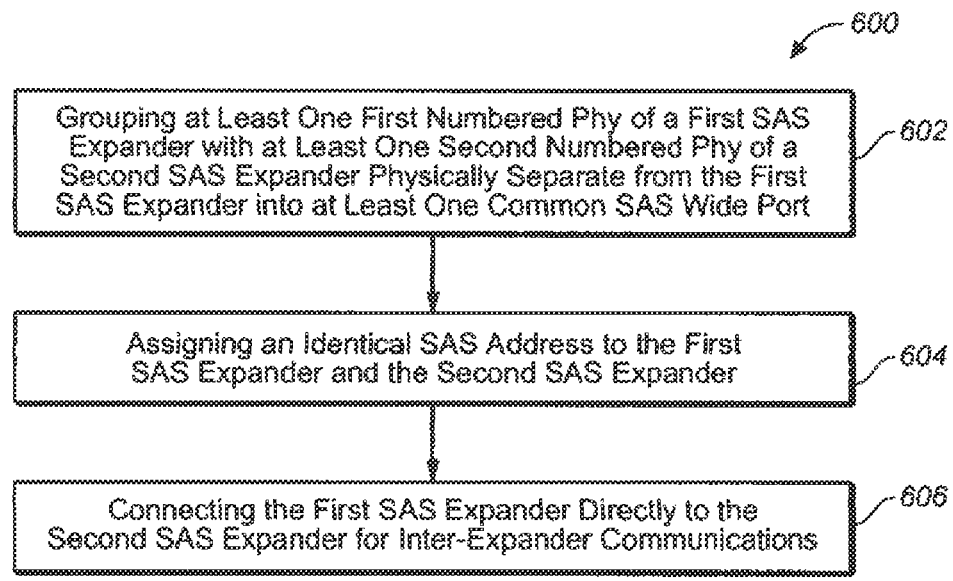
FIG. 6 is a flow diagram illustrating a method for combining multiple SAS expanders to operate as a single, cohesive SAS expander.

Referring generally to FIG. 6, a method for combining multiple SAS expanders is shown. For example, the method may implement techniques for connecting and combining SAS expanders as described below (and as shown in FIGS. 1, 2A through 2E, 3, and 4). The method 600 may include the step of grouping at least one first numbered phy of a first SAS expander with at least one second numbered phy of a second SAS expander physically separate from the first SAS expander into at least one common SAS wide port 602. For example, the grouping into at least one common SAS wide port (205-244) may include assigning an identical SAS address to the at least one common wide port (205-244).

The method 600 may further include the step of assigning an identical SAS address to the first SAS expander and the second SAS expander 604. Assigning an identical SAS address to the first SAS expander and the second SAS expander may allow the first SAS expander and the second SAS expander to behave and respond as a single, cohesive SAS expander 200. The assigning may be performed via firmware executing on the first SAS expander and the second SAS expander. Further, the phy numbering of the first SAS expander and the second SAS expander may be remapped to appear as a single, logically ordered phy numbering of a single, cohesive SAS expander. For example, a first numbered phy of the first SAS expander may be remapped to be in a first range of the single, logically ordered numbering and a second numbered phy of the second SAS expander may be remapped to be in a second range of the single, logically ordered numbering.

The method 600 may further include the step of connecting the first SAS expander directly to the second SAS expander for inter-expander communications 606. The inter-expander communications may utilize SMP communications or other communication methods, such as Inter-Integrated Circuit Bus Protocol (I2C), Enhanced Parallel Port (EPP), Ethernet, shared memory, and the like. In additional embodiments, the connection between the first SAS expander and the second SAS for inter-expander communications (430-435) may be performed via the phys of the first SAS expander and the phys of the second SAS expander. Further, the phys of the first SAS expander for inter-expander communications and the phys of the second SAS expander for inter-expander communications may be hidden from the primary switched domain (410) of the single, cohesive SAS expander. At least two phys of the first SAS expander and at least two phys of the second SAS expander may be used for inter-expander communications between the first SAS expander and the second SAS expander. Further, if at least one SAS expander within the single, cohesive SAS expander remains operational (ex.— such as during an SAS expander failure), all common SAS wide ports remain operational, with all common SAS wide ports operating at a reduced bandwidth.

Figure 5:
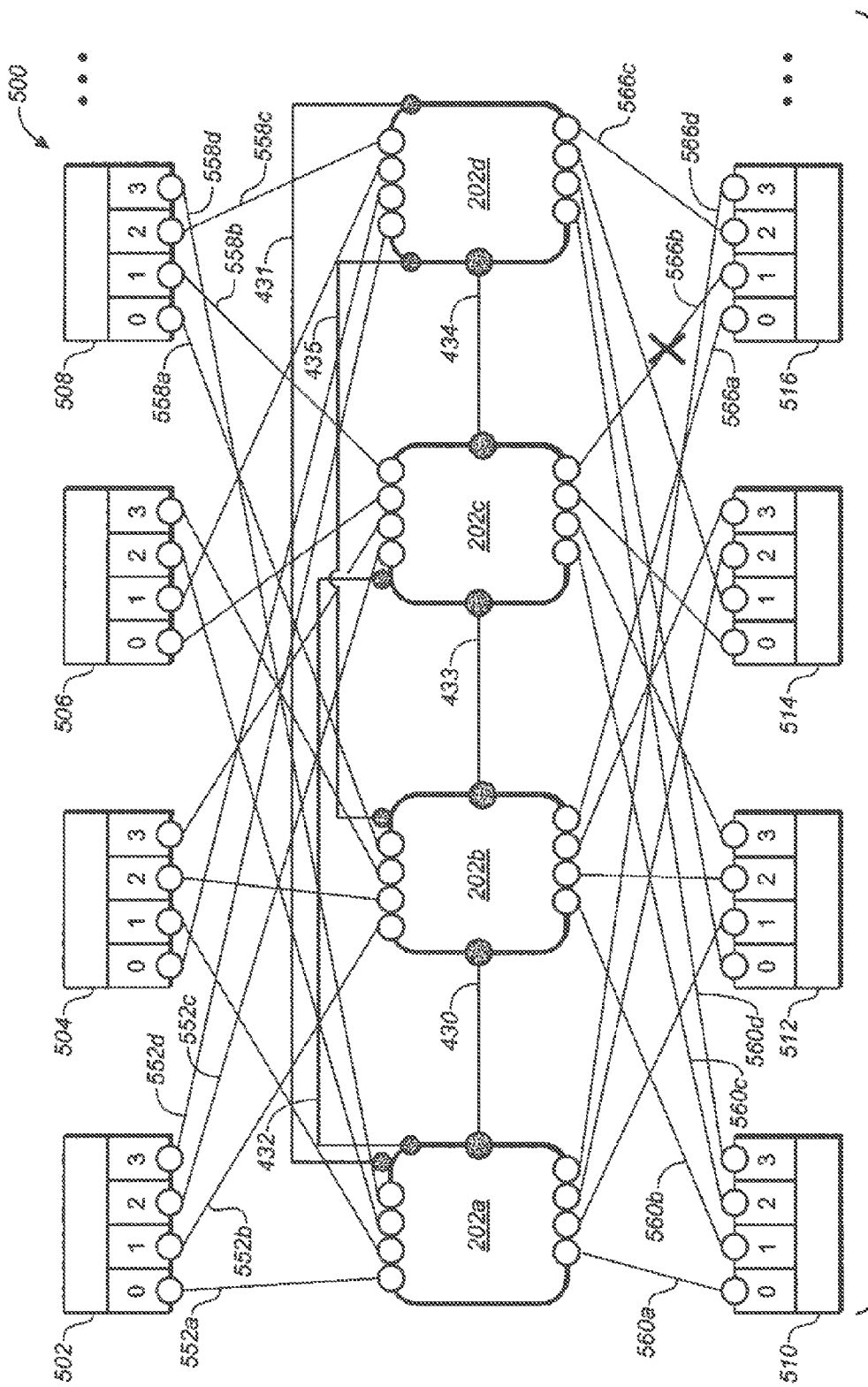
FIG. 5 is a block diagram illustrating a failed internal link within a single, cohesive SAS expander.

The single, cohesive SAS expander 500 may be configured to provide path failover when an internal link fails within the single, cohesive SAS expander. Referring to FIG. 5, and as described above, input ports 502-508 may be connected to each SAS expanders 202a . . . d via links 552a . . . d-558a . . . d. Further, input ports 502-508 may be SAS wide ports. Output ports 510-516 may be connected to each SAS expanders 202a . . . d via links 560a . . . d-566a . . . d. Further, output ports 510-516 may be SAS wide ports. Each of SAS expanders 202a . . . d may be connected to each other via SAS expander ports for inter-expander communications. As shown in single, cohesive SAS expander 500, the link 566b between SAS expander 202c and output port 516 may fail. For example, a physical defect may cause link 566b to fail. As a further example, link 566b may fail to due a logical problem.

The data transfer intended to be transmitted via failed link 566b may be re-routed to another SAS expander connected to output port 516. This data transfer may be re-routed to another SAS expander via the phys used for inter-expander communications between the SAS expanders. As shown in single, cohesive SAS expander 500, the data transfer between SAS expander 202c and output port 516 via failed link 566b may be re-routed through SAS expander 202d via inter-expander communications link 434. From SAS expander 202d, the data transfer may be re-routed to output port 516 via link 566c. Thus output port 516 may receive the data transfer as originally intended, but may receive the data transfer on a different phy. Further, if SAS expander 202d already has an active link to output port 516, SAS expander 202c may respond to the SAS initiator with an arbitration in progress (AlP), as provided via SMP. The SAS initiator may attempt the data transfer at a later time after receiving an AlP or OPEN REJECT (RETRY) SMP response from SAS expander 202c.

In a further aspect of the present disclosure, firmware executing on the SAS expanders may reprogram the SAS expander route tables to re-route connections through inter-expander communications links (430-435) instead of through the failed links. Further, a SAS initiator connected to the single, cohesive SAS expander may learn that link 566b has failed by receiving a CHANGE primitive. For example, SMP provides a CHANGE primitive. The SAS initiator may then perform a SAS Discovery, for example, as provided via SMP. Further, the SAS initiator may note the number of remaining active connections to the target, and may only initiate a number of simultaneous data transfers equal to the number of remaining active connections to the target.

Figure 7:
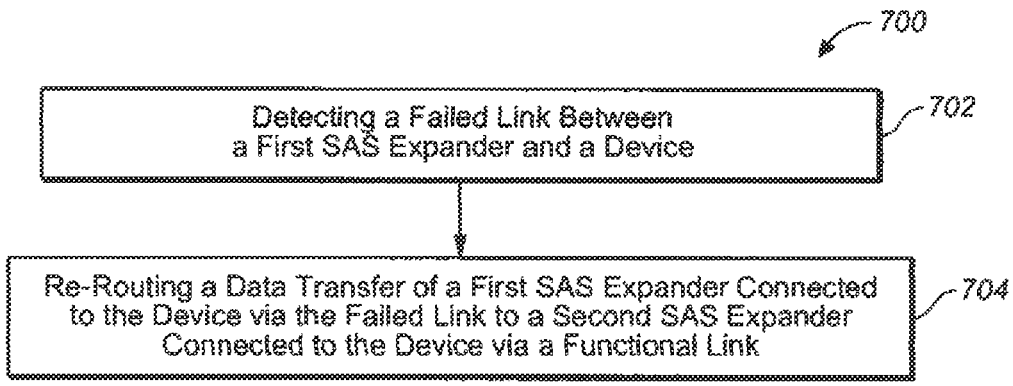
FIG. 7 is a flow diagram illustrating a method for providing path failover when a link fails within a single, cohesive SAS expander

Referring generally to FIG. 7, a method for providing path failover while combining multiple SAS expanders to act as a single, cohesive SAS expander is shown. For example, the method may implement techniques as shown in FIG. 5. In a current embodiment of the current invention, the method 700 includes the step of detecting a failed link between a first SAS expander and a device 702. For example, the detected failed link may fail due to a physical problem. The detected failed link may fail due to a logical problem.

The method 700 may further include the step of re-routing a data transfer of the first SAS expander connected to the device via the failed link to a second SAS expander connected to the device via a functional link 704. For example, the failed link of the single, cohesive SAS expander may fail due to a physical problem within the failed link. In another example, the failed link may fail due to a logical problem. The first SAS expander may be connected to the second SAS expander via the phys of the first SAS expander and the phys of the second SAS expander for inter-expander communications. In further embodiments, the re-routing a data transfer of a SAS expander connected to a device via the failed link to a second SAS expander connected to the device via the functional link may occur via the phys of the first expander for inter-expander communications and the phys of the second SAS expander for inter-expander communications. In exemplary embodiments, the re-routing a data transfer may include reprogramming a route table of the first SAS expander to re-route the data transfer from the failed internal link to the links between via the phys of the first expander for inter-expander communications and the phys of the second SAS expander for inter-expander communications. For example, the reprogramming of the route table of the first SAS expander may be performed via firmware executing on the first SAS expander.

The step of re-routing data transfers from a failed link within the single, cohesive SAS expander to a second SAS expander via a link for inter-expander communications may not indicate to SAS initiators and SAS targets connected to the single, cohesive SAS expander that such re-routing is occurring. However, if the second SAS expander currently has an active link to the device and data is re-routed from the failed link to the second SAS expander, the first SAS expander connected to the device via the failed link may respond with an AlP response. In such a case, a SAS initiator receiving the AlP response may retry the data transfer at a later time. A SAS initiator connected to the single, cohesive SAS expander may be notified of the failed link via receiving a CHANGE primitive. Upon receiving a CHANGE primitive, the SAS initiator may perform a SAS Discovery. For example, SMP provides a SAS Discovery, which includes a SAS Discover and a SAS Discover response.

Figure 8:
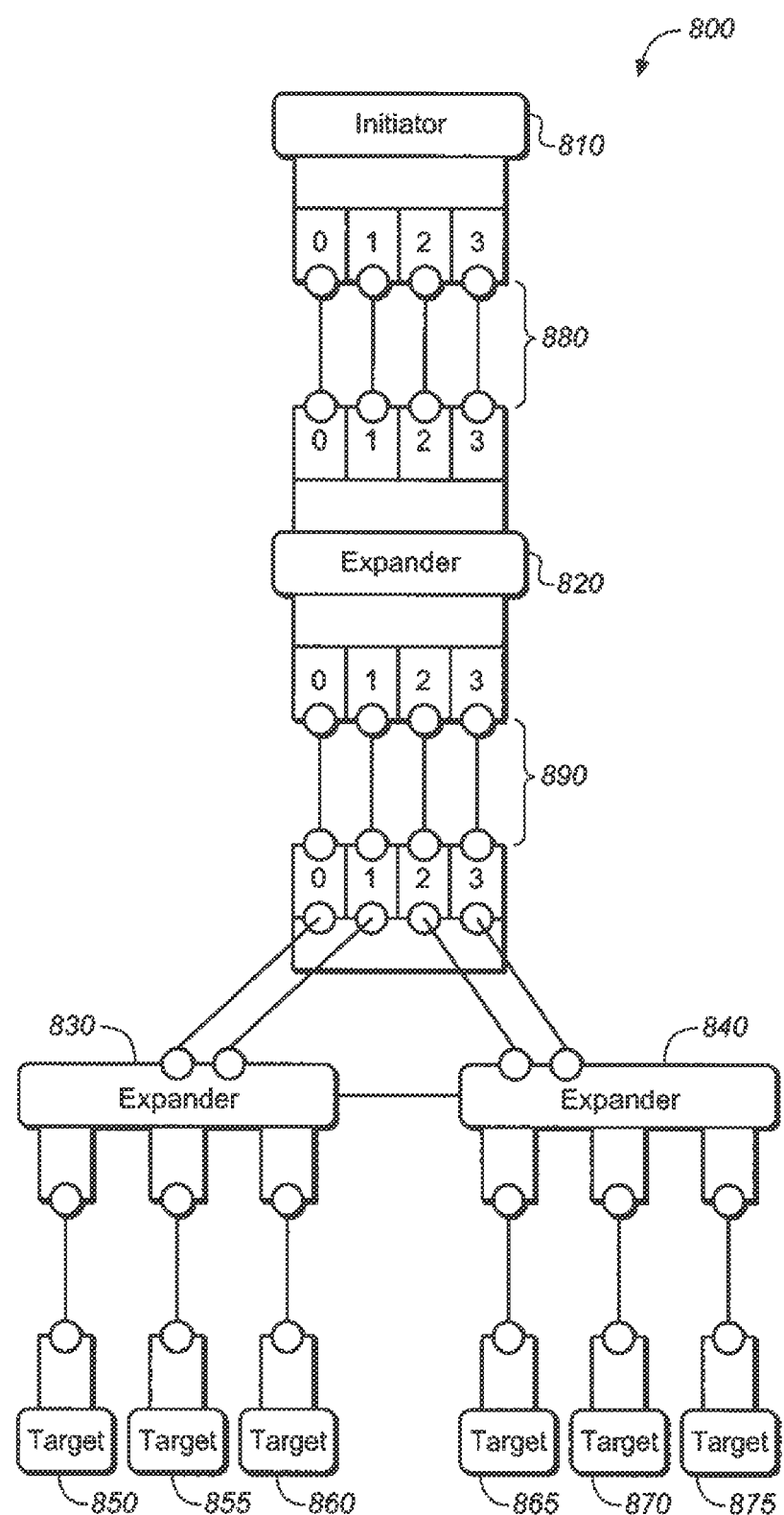
FIG. 8 is a block diagram illustrating selecting lanes of SAS wide ports for a data connection with a single, cohesive SAS expander.

A SAS-initiator specified data connection configuration 800 is provided. Referring to FIG. 8, SAS initiator 810 may be connected to SAS expander 820 via SAS wide port 880. At least one phy of SAS expander 830 and at least one phy of SAS 840 may be combined in common SAS wide port 890. In order for SAS expander 830 and SAS expander 840 to operate as a single, cohesive SAS expander, SAS expander 830 may share an identical SAS address with SAS expander 840. SAS expander 820 may be connected to SAS expander 830 and SAS expander 840 via common SAS wide port 890. SAS expander 830 may also be directly connected to SAS expander 840 via an inter-expander communications link via the phys of SAS expander 830 and the phys of SAS expander 840. SAS expander 830 and SAS expander 840 may not operate as a single, cohesive SAS expander, and may be in a cascaded configuration. A plurality of SAS targets 850-875 may be connected to SAS expander 830 and SAS expander 840 via a SAS narrow port. The number of SAS targets 850-875 may be greater than the number of phys on SAS expander 830 or SAS expander 840. For example, SAS targets 850-875 may be a hard disk array such as a Just a Bunch Of Disks (JBOD) SAS array.

SAS initiator 810 may specify the lanes of wide ports 880, 890 to be used to create a data connection from SAS initiator 810 to one of SAS targets 850-875. Specifying the lanes of wide ports 880, 890, may be used for fairness control, where some lanes of wide ports 880, 890 may be used to access SAS targets 850-875 and other lanes of wide ports 880, 890 may be used to pass through to other parts of a SAS configuration. SAS initiator 810 may further specify the lanes within an OPEN frame of a connection request. Such an OPEN frame may be provided via an SMP connection request. SAS initiator 810 may have learned the optimal lanes for a data connection from SAS initiator 810 to one of SAS targets 850-875 via a performing a standard SAS discovery process. SAS expander 830 and SAS expander 840, along with SAS targets 850-875 may be configured to respond via the SMP Discover response with the optimal lanes for a data connection from SAS initiator 810 to one of SAS targets 850-875. Each SAS expander in the data connection between SAS initiator 810 and one of SAS targets 850-875 may check the OPEN frame of the connection request from SAS initiator 810 for the allowed lanes for the data connection and only makes a data connection on those specified lanes.

Figure 9:
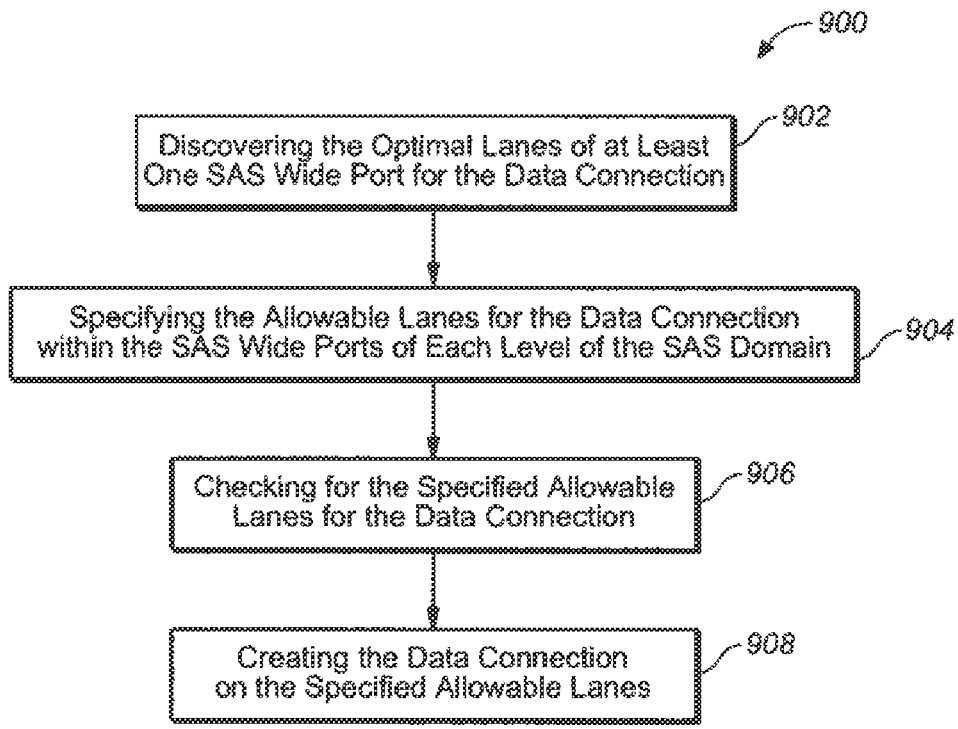
FIG. 9 is a flow diagram illustrating a method for specifying lanes of SAS wide ports for a data connection with a single, cohesive SAS expander.

Referring generally to FIG. 9, a method for specifying allowable lanes of a SAS wide port for a data connection between a SAS initiator and a SAS target in a SAS domain in accordance with an exemplary embodiment of the present disclosure is shown. In a current embodiment of the present disclosure, method 900 includes the step of discovering the optimal lanes of at least one SAS wide port for the data connection 902. For example, SAS initiator 810 may discover the optimal lanes for the data connection via performing a standard SAS discovery process. Further, the SMP Discover response may be used to communicate the optimal lanes for the data connection to SAS initiator 810.

The method 900 may further include the step of specifying the allowable lanes for the data connection within the SAS wide ports of each level of the SAS domain 904. For example, the allowable lanes for the data connection may be specified via a SAS initiator connection request. The allowable lanes for the data connection may further be specified within an OPEN frame of a SAS initiator connection request.

The method 900 may further include the step of checking for the specified allowable lanes for the data connection 906. For example, when a SAS expander (820-840) receives an OPEN frame of a SAS initiator connection request, the SAS expander may check the OPEN frame for the specified allowable lanes for the data connection.

The method 900 may further include the step of creating the data connection of the specified allowable lanes 908. For example, a SAS expander may create the data connection on the specified allowable lanes. Further, the SAS expander may create the data connection after checking the OPEN frame of a SAS initiator connection request for the specified allowable lanes.

A SAS switch implementation 1000 is provided in the current disclosure. Referring generally to FIG. 10, SAS switch 1010 may be a single, cohesive SAS expander. SAS switch 1010 may contain a plurality of SAS expanders 1030-1036. SAS expanders 1030-1036 may be operably coupled to input connectors 1040-1046 via links 1080 and 1090. Each of links 1080, 1090 may be operably coupled to single lanes 0-3 of input connectors 1040-1046. SAS Initiators 1020-1026 may access SAS switch 1010 via input connectors 1040-1046. Lanes 0-3 of input connectors 1040-1046 may operate as SAS wide ports for SAS switch 1010. As shown in FIG. 10, lanes 0-3 of input connectors 1040-1046 may operate as x4 wide input ports for SAS switch 1010; however, other configurations are contemplated by the current disclosure.

SAS expanders 1030-1036 may be operably coupled to output connector 1060 via links 1080, 1090. Each of links 1080, 1090 may be operably coupled to single lanes 0-3 of output connector 1060. SAS switch 1010 may access SAS target 1070 via output connector 1060. Lanes 0-3 of output connector 1060 may operate as SAS wide ports for SAS switch 1010. As shown in FIG. 13, lanes 0-3 of output connector 1060 may operate as a x4 wide output port for SAS switch 1010; however, other configurations are contemplated by the current disclosure.

Single lane 0-3 of input connectors 1040-1046 may be designateable as connection request lanes for input connectors 1040-1046. For example, SAS initiators 1020-1026 may send a SAS OPEN request command over lane 0 of input connectors 1040-1046. In another embodiment, a lane of input connectors 1040-1046 may be designateable as a connection request lane by SAS switch 1010. For example, SAS expanders 1030-1036 may execute firmware to designate a lane of input connectors 1040-1046 as a connection request lane. As shown in FIG. 10, each lane 0 of input connectors may be operably coupled to different SAS expanders 1030-1036 via links 1080 (represented in FIG. 10 by thick lines 1080). Connection requests/commands issued from SAS initiators 1020-1026 may be distributed across SAS expanders 1030-1036. Each lane 0-3 of input connectors 1020-1026 and output connector 1070 may be operably coupled to a phy of SAS expanders 1030-1036. Each input port and each output port of SAS switch 1010 may be operably coupled to each SAS expander 1030-1036.

As shown in the disclosure above and not limited to FIGS. 2A-E and FIG. 3, SAS switch 1010 may include widely varying configurations for input/output port width, number of input/output ports, number of SAS initiators 1020-1026, number of SAS expanders 1030-1036, number of SAS targets 1070, number of lanes 0-3, number of input connectors 1040-1046, number of output connectors 1070, and number of lanes used in connections between input/output ports 1040-1046/1070 and each SAS initiator 1020-1026.

Figure 11:
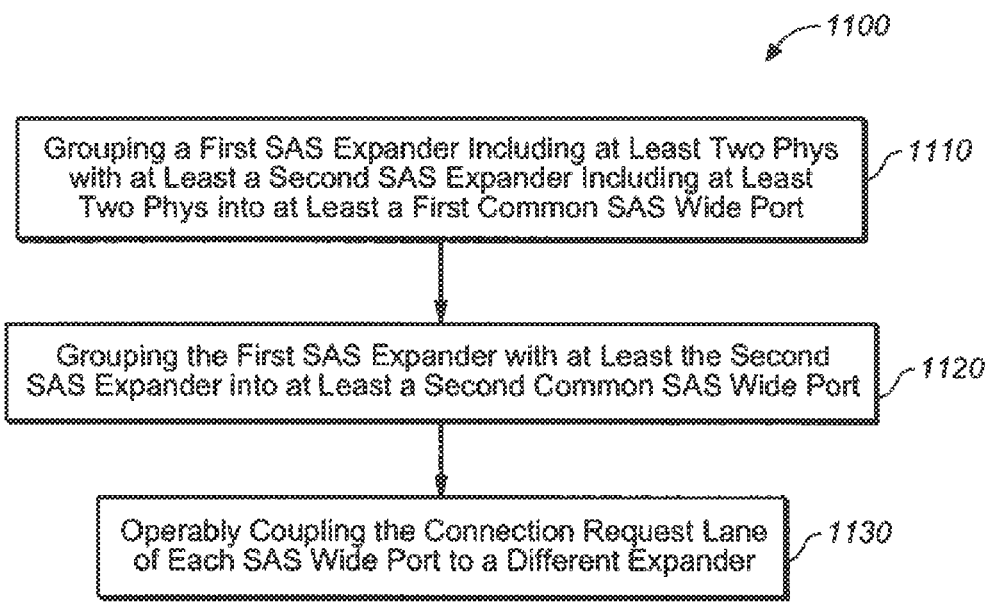
FIG. 11 is a flow diagram illustrating a method of combining multiple SAS expanders as a SAS switch.

Referring generally to FIG. 11, a method for combining multiple SAS expanders into a SAS switch is shown. Method 1100 includes the step of grouping a first SAS expander including at least two phys with at least a second SAS expander including at least two phys into at least a first common wide port, wherein the first common wide port includes at least two lanes 1110. The method 1100 may further include the step of grouping the first SAS expander with at least the second SAS expander into at least a second common SAS wide port, wherein the second common wide port includes at least two lanes 1120. One of the at least two lanes of the first SAS wide port may be designateable as a connection request lane. One of the at least two lanes of the second SAS wide port may be designateable as a connection request lane. In addition, lanes of the SAS wide port may be designateable via accepting connection requests initiated external to the SAS switch. Lanes may be designateable via the SAS switch.

In exemplary embodiments, the method 1100 may further include the step of operably coupling the connection request lane of each SAS wide port to a different expander 1130. Each SAS wide port may be operably coupled to each SAS expander via at least one lane of the each SAS wide port. In addition, the first SAS expander and the second SAS expander may each run firmware to coordinate SAS switch operations. The first SAS expander and the second SAS expander may be operably coupled to the second SAS expander for inter-expander communications.

In the present disclosure, the methods disclosed may be implemented as sets of instructions or software readable by a device. Such software may a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A Serial Attached Small Computer System Interface (SAS) switch including at least three SAS expanders, comprising:
    a first SAS expander including at least three phys;
    a second SAS expander including at least three phys;
    a third SAS expander including at least three phys;
    a first SAS wide port including at least three lanes, one of the at least three lanes of the first SAS wide port designateable as a connection request lane;
    a second SAS wide port including at least three lanes, one of the at least three lanes of the second SAS wide port designateable as a connection request lane,
    a third SAS wide port including at least three lanes, one of the at least two lanes of the third SAS wide port designated as a connection request lane, wherein the connection request lane of each SAS wide port is operably coupled to a different SAS expander of the at least three SAS expanders.

2. The SAS switch of claim 1, wherein each SAS wide port is operably coupled to each SAS expander of the at least three SAS expanders via at least one lane of the each SAS wide port.

3. The SAS switch of claim 1, wherein each lane of each SAS wide port is operably coupled to a phy of a SAS expander of the at least three SAS expanders.

4. The SAS switch of claim 1, wherein the connection request lane of each SAS wide port is designateable as a connection request lane via accepting a SAS connection request initiated external to the SAS switch.

5. The SAS switch of claim 1, wherein the connection request lane of each SAS wide port is designateable as a connection request lane via the SAS switch.

6. The SAS switch of claim 1, wherein the first SAS expander and the second SAS expander each run firmware to coordinate SAS switch operations.

7. The SAS switch of claim 1, wherein the first SAS expander is operably coupled to the second SAS expander for inter-expander communications.

8. A method for combining multiple Serial Attached Small Computer System Interface (SAS) expanders into a SAS switch, comprising:
    grouping a first SAS expander including at least three phys with at least a second SAS expander including at least three phys and with at least a third SAS expander including at least three phys into at least a first common wide port, wherein the first common wide port includes at least three lanes;
    grouping the first SAS expander with at least the second SAS expander and with at least the third SAS expander into at least a second common SAS wide port, wherein the second common wide port includes at least three lanes;
    grouping the first SAS expander with at least the second SAS expander and with at least the third SAS expander into at least a third common SAS wide port, wherein the third common wide port includes at least three lanes, wherein one of the at least three lanes of the first SAS wide port is designateable as a connection request lane, wherein one of the at least three lanes of the second SAS wide port is designateable as a connection request lane, wherein one of the at least three lanes of the first SAS wide port is designateable as a connection request lane; and
    operably coupling the connection request lane of each SAS wide port to a different expander.

9. The method of claim 8, further comprising:
    operably coupling each SAS wide port to each SAS expander via at least one lane of the each SAS wide port.

10. The method of claim 8, wherein one of the at least three lanes of the first SAS wide port is designateable as a connection request lane via accepting a SAS connection request initiated external to the SAS switch; and
    wherein one of the at least three lanes of the second SAS wide port is designateable as a connection request lane via accepting a SAS connection request initiated external to the SAS switch.

11. The method of claim 8, wherein one of the at least three lanes of the first SAS wide port is designateable as a connection request lane via the SAS switch; and
    wherein one of the at least three lanes of the second SAS wide port is designateable as a connection request lane via the SAS switch.

12. The method of claim 8, wherein the first SAS expander and the second SAS expander each run firmware to coordinate SAS switch operations.

13. The method of claim 8, wherein the first SAS expander is operably coupled to the second SAS expander for inter-expander communications.

* * * * *